United States Patent Office 2,994,638
Patented Aug. 1, 1961

2,994,638
AGENT FOR COMBATING RODENTS

Hugo Malz, Leverkusen, Adam Müller, Hallstadt, Bamberg, and Richard Wegler, Leverkusen, Germany, assignors to Farbenfabriken Bayer Aktiengesellschaft, Leverkusen, Germany, a corporation of Germany
No Drawing. Filed Feb. 17, 1959, Ser. No. 793,697
Claims priority, application Germany Feb. 20, 1958
18 Claims. (Cl. 167—46)

The present invention relates to and has as its objects a new method of combating rodents especially rats and mice, and rodenticidal compositions containing as active ingredients substances of the following general formula

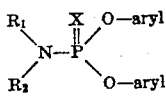

wherein X stands for a member selected from the group consisting of oxygen and sulfur, aryl preferably stands for phenyl radicals, which furthermore may be substituted with halogen or nitro groups, especially with chlorine groups; $R_1$ stands for hydrogen, a lower alkyl or alkenyl radical or halogen-substituted lower alkyl radical or aryl group; $R_2$ stands for hydrogen, lower alkyl, lower alkenyl or aryl, or halogen-substituted lower alkyl radicals, $R_2$ furthermore may be an alkylene radical linking the whole phosphoric or thiophosphoric diaryl-ester-amide group to another same or different group of this type; $R_1$ and $R_2$ together with nitrogen furthermore may form a saturated heterocyclic ring system such as piperidine, piperazine, morpholine, pyrolidine, and the like.

For combating the field mouse (Microtus agrestis), vole (Arvicola terrestris) and vole-field (harvest mouse) (Microtus arvalis) and also other rodent pests such as the Philippine rat (Rattus philippinensis) on vast cultivated areas a surface spraying process has chiefly been used up to the present by which highly toxic insecticides such as for example those based on chlorinated diene addition products are sprayed. Most of the noxious rodents are thereby killed by eating the parts of the plant rendered poisonous. The disadvantages incurred by the use of these highly toxic compounds are, therefore, obvious; they consist in the risk to man, wild and domestic animals, in the killing of fish and also in the killing or harm to useful soil insects.

It has now been found that certain esters of amidophosphoric acids or of amidothiophosphoric acids especially those shown by the above formula can be used with great advantage as rodenticides in the surface spraying process. These compounds do not possess the disadvantageous properties described above. The esters of amidophosphoric acid or amidothiophosphoric acid show a moderately acute per oral toxicity against warm-blooded animals. Thus, an acute per oral LD$_{50}$ of 50 mg./kg. on the rat has been established with, for example, N-dimethyl or N-diethyl amidophosphoric acid-4, 4'-dichloro-diphenyl ester whilst, for example, compounds of the above-described class show an acute per oral LD$_{50}$ of about 10 mg./kg. on the rat. As regarding their cumulative properties the chlorinated hydrocarbons have, moreover, an additional action.

The amidophosphoric acid esters to be used according to the invention are in this case especially useful. Applied in high quantities (e.g. 25 mg./kg. rat) the chronical per oral LD$_{50}$ lies between three times 30 mg./kg. and four times 25 mg./kg. with rats. Although the aforesaid amido-phosphoric acid esters have an acute per oral LD$_{50}$ of 50 mg./kg. rat, it has been impossible even in extended experimental series to kill more than 10% of the animals used with doses of five times 10 mg./kg. or 10 times 5 mg./kg. or twenty times 2.5 mg./kg. in the stomach sound test. Whilst a cumulative action of a rodenticide is in most cases desirable for the destruction of a rodent it is of doubtful value with regard to useful animals. It is always more expedient to kill rodents with one dose since useful animals are in this way not harmed by an hazardous intake of poison.

Since in the practical application of toxic phosphoric acid esters smaller quantities enter the body of useful animals more readily than larger portions at any instant, the advantage of the compounds to be used according to the invention compared with those of prior art is obvious. The diminishing of the risk for useful animals is due to a more rapid decomposition of the amidophosphoric acid esters on the fodder plant as compared with chlorinated hydrocarbons and to the lack of cumulative properties in the animal organism.

Laboratory and field experiments on rats, field mice, voles and field-voles have shown that by rendering food poisonous as, for example, with the aid of the surface spraying process, a 100% kill results when applying the compounds claimed for combating field mice and field-voles preferably in a 0.05–0.5%, especially about a 0.15% solution of active substance, and for combating rats and voles in a 0.1–1.0%, especially about a 0.3% solution of active substance.

The solutions to be used according to this invention may be prepared advantageously by mixing the active ingredient with an auxiliary solvent such as acetone, formamide, dimethyl formamide, acetamide, xylene, toluene, chlorobenzene, and the like. This auxiliary solvent is used between the same amount and about 10 times as much as the active ingredient. Furthermore for preparing aqueous solutions which are preferably used according to the present invention this pre-mixture of active ingredient and auxiliary solvent is mixed with a compatible emulsifier such as especially polyglycolated phenols, e.g. benzyl hydroxy diphenyl polyglycol ether. Other emulsifiers of anionic or cationic nature may also be used in some cases.

It is surprising that the compounds to be used according to the invention do not possess any insecticidal action at the above-mentioned concentrations. For example, flies, aphids, Colorado beetles and grain weevils are in no case killed by use of a 0.2% solution of active substance of the aforesaid amido esters. Neither are the useful soil insects killed by use of the compounds according to the invention in the area spraying process.

A further particular advantage of the amidophosphoric acid esters can be seen in the fact that the fish toxicity is about one thousand times less than that of highly chlorinated hydrocarbons based on diene addition products hitherto used for combating rats. The fish toxicity for 1.2.3.4.10.10 - hexachloro-6.7-epoxy-1.4.4a.5.6.7.8.8a-octahydro-1.4.5.8-endo - endo - dimethano - naphthaline amounts, for example, to LD$_{50}$ 0.0001 p.p.m., but for N-dimethyl or N-diethyl amidophosphoric acid-4.4'-dichlorophenyl ester the fish toxicity is only LD$_{50}$ 1–10 p.p.m. This slight toxicity is especially important for the spraying process in the vicinity of waters.

Moreover, the compounds claimed are distinguished by a high ultra violet stability thus ensuring a sufficient stability of the active substance in the open air. On the other hand, the active substance is decomposed on the plant or on the soil after some time thus reducing the risk for useful beings. It is of further importance that the compounds claimed have no phytotoxic action so that their application is without risk to the plant growth.

The amidophosphoric acid esters or amidothiophosphoric acid esters claimed as rodenticides are known from the literature or easily obtainable by known processes such as for example by amidation of phosphoric or thiophosphoric acid chlorides or by conversion of amidophosphoric acid or amidothiophosphoric acid chlorides with the corresponding alcohols or alcoholates (cf. inter alia: Kosolapoff, Orango Phosphorus Compounds).

The use as plant protectants of phosphoric acid esters or phosphorus amido compounds is customary to a great extent but neither phosphoric acid esters nor phosphorus amido compounds are hitherto known the properties of which have enabled them to be used as rodenticide in conditions as favourable as shown above.

The following examples are given for the purpose of illustrating the invention:

*Example 1*

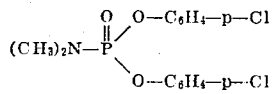

515 grams of p-chlorophenol are dissolved in a 10% aqueous solution containing 165 grams of sodium hydroxide. This solution is cooled at 10° C. whereafter 324 grams of dimethyl amidophosphoric acid dichloride (prepared according to Ann., 326, p. 129) are introduced slowly into this solution. By cooling the reaction temperature has to be kept at about 10 to 15° C. After the addition has been completed the mixture is stirred for 2 further hours. Then the two layers are separated and the lower oily layer is washed twice with 500 ml. of water. The remaining quantities of water are removed by distillation in vacuum (about 12 mm. Hg at 50° C.). The crude ester is almost pure. The yield is about quantitative. For further purification the ester may be distilled at 0.01 mm. Hg at 183–185° C.

*Example 2*

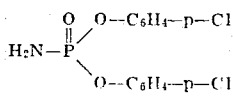

30 grams of O.O-di-p-chloro-phenyl phosphoric acid ester monochloride are added in small portions while stirring to 150 ml. of 30% ammonium hydroxide. The reaction temperature is kept by external cooling with running water at about 30° C. The compound of the above shown formula precipitates in colorless crystalline form. The precipitate is removed by filtration with suction and washed with water until the wash liquor is almost neutral. The yield is almost quantitative. For further purification the compound may be recrystallized from alcohol and then melts at 152–155° C.

*Example 3*

30 field mice were placed in a 20 square metre-open air enclosure laid out with turf. After a few days when the animals got acclimatized N-dimethylamidophosphoric acid-4.4'-dichlorodiphenyl ester in the form of a 0.066% (active ingredient) solution, which has been prepared by diluting a pre-mixture of equal parts of active ingredient, xylene and 2 times the amount of active substance of a commercial emulsifier consisting of a benzyl hydroxy-diphenyl-polyglycol ether, and in an amount of 400 grams/ha. was sprayed onto the approximately 5 cm. high grass.

Up to the fifth day 13 dead field mice were found on the surface and 17 field mice were found dead in their nests.

*Example 4*

20 field-voles were placed in a 20 square metre-open air enclosure likewise laid out with turf. The grass had a height of about 15 cm. at the time of treatment. 900 grams of active substance of the compound N-diethyl amidophosphoric acid-4.4'-dichlorodiphenyl ester calculated on 1 ha. were sprayed in the form of a 0.15% solution of active substance prepared as described in Example 1. 5 days after starting the test a 100% kill of the field-voles was observed which were found partly dead on the surface and partly in their nests.

*Example 5*

A 0.3% solution of active substance of the compound N - dimethylamidophosphoric acid - 4.4' - dichlorodiphenyl ester (prepared as described in Example 1) was sprayed onto potted grass tufts, and each of 3 voles in cages were offered in addition to apple and grain feed supplement one pot of treated and one pot of untreated grass as feed. In all cases the grass in both pots was completely eaten in approximately the same time. A preferred intake of the untreated grass could not be observed.

On the fourth day after starting the test all voles were found dead in their cages.

*Example 6*

One week after treating a turf with a 0.3% solution of active substance of the compound N-dimethylamidophosphoric acid-4.4'-dichlorodiphenyl ester (prepared as described in Example 1) 3 rabbits were placed. Although the rabbits were offered no other feed supplement during the 3 day-compulsory test none of the animals fell sick during the 30 days-observation.

A 0.05% aqueous emulsion of 1.2.3.4.10.10-hexachloro-6.7-epoxy-1.4.4a.5.6.7.8.8a-octahydro-1.4.5.8-endo-endo-dimethano-naphthalene was sprayed onto a control surface. Of 3 rabbits kept under the same conditions as previously, two of them died within 5 days of observation whilst 1 animal became seriously ill but slowly recovered within the course of further observation.

From a further number of investigated representatives of amidophosphoric acid esters there may be mentioned in addition to those indicated in Examples 3–6 a few more which are especially active without limiting the scope of the invention in any way:

N-dimethyl or N-diethyl amidothiophosphoric acid-4.4'-dichloro-diphenyl ester,
N-2-chlorethylamidophosphoric acid-4.4'-dichlorodiphenyl ester,
N - dimethylamidophosphoric acid - 4.4' - dinitrodiphenyl ester,
N-dimethylamidophosphoric acid-2.2'-4.4'-tetrachlorodiphenyl ester,
N - diallylamidophosphoric acid - 4.4' - dichlorodiphenyl ester,
N - dimethylamidophosphoric acid - 2.2' - dichlorodiphenyl ester,
Morpholido-phosphoric acid-4.4'-dichloro-diphenyl ester,
Piperidino-thiophosphoric acid-4.4'-dichloro-diphenyl ester,
N-(bis-2-chloroethyl)-amidophosphoric acid - 4.4'-dichloro-diphenyl ester,
N-methylamido-phosphoric acid-4.4'-dichlorodiphenyl-ester,
N-methylamido-thiophosphoric acid-4.4'-dichlorodiphenyl ester,
N-ethylamido-phosphoric acid-4.4'-dichlorodiphenyl ester,
N-ethylamido-thiophosphoric acid-4.4' - dichlorodiphenyl ester,
Amidophosphoric acid-4.4'-dichlorodiphenyl ester,
Amidothiophosphoric acid-4.4'dichlorodiphenyl ester,
Amidothiophosphoric acid-4-chlorodiphenyl ester,
Ethylene-1.2-diamido-N.N' - (bis-phosphoric acid-4.4'-dichlorodiphenyl ester),
Ethylene-1.2-diamido-N.N'-(bis-thiophosphoric acid-4.4'-dichlorodiphenyl ester),
Anilido-phosphoric acid-4,4'-dichlorodiphenyl ester,
4-chloroanilido-phosphoric acid - 4.4' - dichlorodiphenyl-ester.

We claim:
1. A method of combating rodents which comprises spraying cultivated areas which are infested with rodents with aqueous emulsions containing as an active ingredient a compound of the following formula

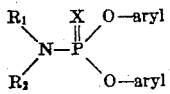

in which X stands for a member selected from the group consisting of oxygen and sulfur, aryl stands for a member selected from the group consisting of phenyl, halogen-substituted phenyl and nitro-substituted phenyl; $R_1$ stands for a member selected from the group consisting of hydrogen, lower alkyl, lower alkenyl, chloro-substituted lower alkyl, phenyl and chloro-substituted phenyl radicals; $R_2$ stands for a member selected from the group consisting of lower alkyl, lower alkenyl, chloro-substituted lower alkyl radicals and

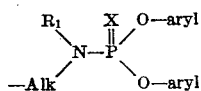

wherein Alk is a lower alkylene radical and the other symbols have the above defined significance, $R_1$ and $R_2$ together with nitrogen can furthermore stand for a member selected from the group consisting of morpholine and piperidine—in a concentration of 0.05–1% of said active ingredient.

2. A method of combating rodents which comprises spraying cultivated areas which are infested with rodents with aqueous emulsions containing as an active ingredient the compound N-dimethylamidophosphoric acid-4.4'-dichlorodiphenyl ester.

3. A method of combating rodents which comprises spraying cultivated areas which are infested with rodents with aqueous emulsions containing as an active ingredient the compound N-diethyl amidophosphoric acid-4.4'-dichlorodiphenyl ester.

4. A method of combating rodents which comprises spraying cultivated areas which are infested with rodents with aqueous emulsions containing as an active ingredient the compound N-dimethyl amidothiophosphoric acid-4.4'-dichlorodiphenyl ester.

5. A method of combating rodents which comprises spraying cultivated areas which are infested with rodents with aqueous emulsions containing as an active ingredient the compound N-diethyl amidothiophosphoric acid-4.4'-dichlorodiphenyl ester.

6. A method of combating rodents which comprises spraying cultivated areas which are infested with rodents with aqueous emulsions containing as an active ingredient the compound N-2-chloroethyl amidophosphoric acid-4.4'-dichlorodiphenyl ester.

7. A method of combating rodents which comprises spraying cultivated areas which are infested with rodents with aqueous emulsions containing as an active ingredient the compound N-dimethylamido phosphoric acid-2.2'-4.4'-tetrachloro-diphenyl ester.

8. A method of combating rodents which comprises spraying cultivated areas which are infested with rodents with aqueous emulsions containing as an active ingredient the compound N-diallylamidophosphoric acid-4.4'-dichloro-diphenyl ester.

9. A method of combating rodents which comprises spraying cultivated areas which are infested with rodents with aqueous emulsions containing as an active ingredient the compound piperidino-thiophosphoric acid-4.4'-dichloro-diphenyl-ester.

10. A method of combating rodents which comprises spraying cultivated areas which are infested with rodents with aqueous emulsions containing as an active ingredient the compound N-methylamido-phosphoric acid-4.4'-dichlorodiphenyl ester.

11. A method of combating rodents which comprises spraying cultivated areas which are infested with rodents with aqueous emulsions containing as an active ingredient the compound N-methylamido-thiophosphoric acid-4.4'-dichlorodiphenyl-ester.

12. A method of combating rodents which comprises spraying cultivated areas which are infested with rodents with aqueous emulsions containing as an active ingredient the compound N-ethylamido-phosphoric acid-4.4'-dichlorodiphenyl ester.

13. A method of combating rodents which comprises spraying culivated areas which are infested with rodents with aqueous emulsions containing as an active ingredient the compound N-ethylamido-thiophosphoric acid-4.4'-dichlorodiphenyl ester.

14. A method of combating rodents which comprises spraying cultivated areas which are infested with rodents with aqueous emulsions containing as an active ingredient the compound amidophosphoric acid-4.4'-dichlorodiphenyl ester.

15. A method of combating rodents which comprises spraying cultivated areas which are infested with rodents with aqueous emulsions containing as an active ingredient the compound amidothiophosphoric acid-4.4'-dichlorodiphenyl ester.

16. A method of combating rodents which comprises spraying cultivated areas which are infested with rodents with aqueous emulsions containing as an active ingredient the compound ethylene-1.2-diamido-N.N'-(bis-phosphoric acid-4.4'-dichlorodiphenyl ester).

17. A method of combating rodents which comprises spraying cultivated areas which are infested with rodents with aqueous emulsions containing as an active ingredient the compound ethylene-1.2-diamido-N.N'-(bis-thiophosphoric acid-4.4'-dichlorodiphenyl ester).

18. The compound of the following formula

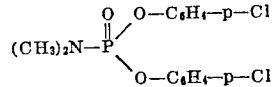

References Cited in the file of this patent
UNITED STATES PATENTS

| | | |
|---|---|---|
| 2,146,356 | Schrader et al. | Feb. 7, 1939 |
| 2,494,283 | Cassady | Jan. 10, 1950 |
| 2,494,284 | Cassady et al. | Jan. 10, 1950 |
| 2,615,037 | Moyle | Oct. 21, 1952 |
| 2,615,038 | Moyle | Oct. 21, 1952 |
| 2,912,452 | Schrader | Nov. 10, 1959 |